United States Patent
Li et al.

(10) Patent No.: US 12,124,812 B2
(45) Date of Patent: Oct. 22, 2024

(54) MULTILINGUAL CONTENT RECOMMENDATION PIPELINE

(71) Applicant: Microsoft Technology Licensing, LLC, Redmond, WA (US)

(72) Inventors: Ji Li, San Jose, CA (US); Amit Srivastava, San Jose, CA (US); Xingxing Zhang, Beijing (CN); Furu Wei, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 194 days.

(21) Appl. No.: 17/510,850

(22) Filed: Oct. 26, 2021

(65) Prior Publication Data

US 2023/0129314 A1  Apr. 27, 2023

(51) Int. Cl.
  *G06F 40/56* (2020.01)
  *G06F 40/284* (2020.01)
  *G06F 40/47* (2020.01)

(52) U.S. Cl.
  CPC ............ *G06F 40/56* (2020.01); *G06F 40/284* (2020.01); *G06F 40/47* (2020.01)

(58) Field of Classification Search
  CPC ........ G06F 40/56; G06F 40/284; G06F 40/47; G06F 40/216; G06F 40/263; G06F 40/30; G06F 40/44; G06F 40/169
  See application file for complete search history.

(56) References Cited

U.S. PATENT DOCUMENTS

| 9,158,559 B2 | 10/2015 | Simmons et al. |
| 9,195,910 B2 | 11/2015 | Garera et al. |
| 9,779,087 B2 | 10/2017 | Das et al. |

(Continued)

FOREIGN PATENT DOCUMENTS

WO  2020220369 A1  11/2020

OTHER PUBLICATIONS

"Non Final Office Action Issued in U.S. Appl. No. 17/131,624", Mailed Date: Sep. 14, 2022, 53 Pages.

(Continued)

*Primary Examiner* — Daniel C Washburn
*Assistant Examiner* — Paul J. Mueller
(74) *Attorney, Agent, or Firm* — NovoTechIP International PLLC

(57) ABSTRACT

A data processing system implements obtaining first textual content in a first language from a first client device; determining that the first language is supported by a first machine learning model; obtaining a guard list of prohibited terms associated with the first language; determining that the textual content does not include one or more prohibited terms associated based on the guard list; providing the first textual content as an input to the first machine learning model responsive to the textual content not including the one or more prohibited terms; analyzing the first textual content with the first machine learning model to obtain a first content recommendation; obtaining a first content recommendation policy that identifies content associated with the first language that may not be provided as a content recommendation; determining that the first content recommendation is not prohibited; and providing the first content recommendation to the first client device.

17 Claims, 8 Drawing Sheets

(56) References Cited

U.S. PATENT DOCUMENTS

| | | | |
|---|---|---|---|
| 10,033,808 | B2 | 7/2018 | Simmons et al. |
| 10,460,036 | B2 | 10/2019 | Duong |
| 10,872,204 | B2 | 12/2020 | Zhu et al. |
| 11,082,369 | B1 | 8/2021 | Liu et al. |
| 11,663,219 | B1* | 5/2023 | Profirovic .......... G06F 16/2457 707/713 |
| 11,803,883 | B2 | 10/2023 | Wu |
| 11,875,131 | B2 | 1/2024 | Li |
| 2006/0136223 | A1 | 6/2006 | Brun |
| 2008/0306728 | A1* | 12/2008 | Kamatani .............. G06F 40/55 704/7 |
| 2011/0191105 | A1* | 8/2011 | Spears ................... G06F 40/10 704/251 |
| 2015/0019200 | A1 | 1/2015 | Woodward et al. |
| 2018/0107945 | A1* | 4/2018 | Gao ........................ G06N 7/01 |
| 2018/0314689 | A1 | 11/2018 | Wang et al. |
| 2018/0356957 | A1* | 12/2018 | Desjardins ........... G06F 40/274 |
| 2019/0197484 | A1 | 6/2019 | Jamali et al. |
| 2019/0236146 | A1 | 8/2019 | Niekrasz |
| 2020/0043495 | A1* | 2/2020 | Park ........................ G10L 15/25 |
| 2020/0125639 | A1 | 4/2020 | Doyle |
| 2020/0125729 | A1* | 4/2020 | Priel ..................... G06F 11/302 |
| 2020/0159871 | A1* | 5/2020 | Bowen ................... G06T 11/60 |
| 2020/0393915 | A1* | 12/2020 | Brendel ........... G06F 18/23213 |
| 2021/0264106 | A1 | 8/2021 | Li et al. |
| 2021/0357599 | A1 | 11/2021 | Gupta et al. |
| 2022/0075945 | A1 | 3/2022 | Zhang |
| 2022/0188575 | A1 | 6/2022 | Zhu et al. |
| 2022/0198157 | A1 | 6/2022 | Li et al. |
| 2022/0366295 | A1 | 11/2022 | Lamba |
| 2023/0129314 | A1 | 4/2023 | Li et al. |
| 2023/0274096 | A1 | 8/2023 | Bohra et al. |

OTHER PUBLICATIONS

Sun, et al., "MobileBERT: A Compact Task-Agnostic BERT for Resource-Limited Devices", In Proceedings of the 58th Annual Meeting of the Association for Computational Linguistics, Jul. 5, 2020, pp. 2158-2170.

Husain, et al., "A Survey of Offensive Language Detection for the Arabic Language", In Journal of ACM Transactions on Asian and Low-Resource Language Information Processing, vol. 20, Issue 1, Mar. 9, 2021, 44 Pages.

"International Search Report and Written Opinion Issued in PCT Application No. PCT/US22/039648", Mailed Date: Oct. 26, 2022, 11 Pages.

Lample, et al., "MUSE: Multilingual Unsupervised and Supervised Embeddings", Retrieved from: https://github.com/facebookresearch/MUSE#ground-truth-bilingual-dictionaries, Retrieved on: Jan. 20, 2022, 9 Pages.

Laujan, et al., "Quickstart: Get started with Translator", Retrieved from: https://docs.microsoft.com/en-us/azure/cognitive-services/Translator/quickstart-translator?tabs=csharp, Jan. 29, 2022, 18 Pages.

Prajapati, et al., "Automated Text Categorization with Machine Learning and its Application in Multilingual Text Categorization", In Proceeding of National Conference on Advance Computing, Jan. 1, 2009, pp. 204-209.

Bentaallah, et al., "The Use of Word Nets for Multilingual Text Categorization: A Comparative Study", Published in ICWIT, Jan. 1, 2012, pp. 121-128.

El-Alami, et al., "A Multilingual Offensive Language Detection Method based on Transfer Learning from Transformer Fine-tuning Model", In Journal of King Saud University-Computer and Information Sciences, Jul. 15, 2021, pp. 6048-6056.

"International Search Report and Written Opinion Issued in PCT Application No. PCT/US22/050994", Mailed Date: Mar. 27, 2023, 11 Pages.

Catal, et al., "A Sentiment Classification Model based on Multiple Classifiers", In Journal of Applied Soft Computing, vol. 50, Jan. 2017, pp. 135-141.

"Final Office Action Issued in U.S. Appl. No. 17/131,624", Mailed Date: Apr. 18, 2023, 56 Pages.

Bari, et al., "MultiMix: A Robust Data Augmentation Strategy for Cross-Lingual NLP", In Repository of arXiv:2004.13240v1, Apr. 28, 2020, 11 Pages.

Ellis, et al., "Why We Watch the News: A Dataset for Exploring Sentiment in Broadcast Video News", In Proceedings of the 16th International Conference on Multimodal Interaction, Nov. 12, 2014, pp. 104-111.

Gupta, et al., "Compression of Deep Learning Models for Text: A Survey", In Journal of ACM Transactions on Knowledge Discovery from Data, vol. 16, Issue 4, Jan. 8, 2022, 55 Pages.

Hosseini, et al., "Crowdcloud: a Crowdsourced System for Cloud Infrastructure", In Journal of Cluster Computing vol. 22, Issue 2, Aug. 30, 2018, pp. 455-470.

Liu, et al., "Upgrading the Newsroom: An Automated Image Selection System for News Articles", In Repository of arXiv:2004.11449v1, Apr. 23, 2020, 28 Pages.

"International Search Report and Written Opinion Issued in PCT Application No. PCT/US21/060909", Mailed Date: Mar. 10, 2022, 14 Pages.

Yarowsky, et al., "Inducing Multilingual Text Analysis Tools via Robust Projection across Aligned Corpora", In Proceedings of the First International Conference on Human Language Technology Research, Mar. 18, 2001, 8 Pages.

Riloff, et al., "Inducing Information Extraction Systems for New Languages via Cross-Language Projection", In Proceedings of 19th International Conference on Computational Linguistics, Aug. 24, 2002, 7 Pages.

Pikuliak, et al., "Cross-lingual learning for text processing: A survey", In Journal of Expert Systems with Applications vol. 165, Mar. 1, 2021, 26 Pages.

U.S. Appl. No. 17/681,250, filed Feb. 25, 2022.

Adams et al., "Cross-Lingual Word Embeddings for Low-Resource Language Modeling," Proceedings of the 15th Conference of the European Chapter of the Association for Computational Linguistics, vol. 1, Long Papers, pp. 937-947, Apr. 2017.

Chen et al., "Model Selection for Cross-Lingual Transfer using a Learned Scoring Function", arXiv preprint arXiv:2010.06127, pp. 1-15, Oct. 2020.

He et al., "Multi-Level Cross-Lingual Transfer Learning with Language Shared and Specific Knowledge for Spoken Language Understanding", IEEE, vol. 8, pp. 29407-29416, Feb. 2020.

Non-Final Office Action mailed on Dec. 1, 2023, in U.S. Appl. No. 17/131,624, 25 pages.

Rahimi et al., "Massively Multilingual Transfer for NER", Proceedings of the 57th Annual Meeting of the Association for Computational Linguistics, pp. 151-164, Jul. 2019.

Final Office Action mailed on Apr. 3, 2024, in U.S. Appl. No. 17/131,624, 34 pages.

Valizadegan, et al., "Kernel Based Detection of Mislabeled Training Examples," Proceedings of the 2007 Society for Industrial and Applied Mathematics (SIAM) International Conference on Data Mining, Apr. 2007, pp. 309-319.

Non-Final Office Action Issued in U.S. Appl. No. 17/681,250, mailed on Aug. 7, 2024, 20 pages.

Notice of Allowance mailed on Aug. 30, 2024, in U.S. Appl. No. 17/131,624, 14 pages.

\* cited by examiner

MULTILINGUAL CONTENT RECOMMENDATION PIPELINE

BACKGROUND

Natural language processing (NLP) models have been developed that provide very accurate processing of English language textual content. Applications may use these NLP models to extract contextual information from the English language textual content and use this contextual information to provide various services to the users of the application. However, applications may have a global userbase that speaks and creates content in numerous other languages. Thus, multilingual support is critical to providing these services to global customers who do not use the English language in the content that they create.

One current approach for providing multilingual support is to use machine translation to translate a user's textual input from the language in which the content was created to English language textual content. The English language textual content may then be processed by NLP models to obtain contextual information that may be used by the application to provide services to the user. This approach may be accurate, but the latency associated with this approach is often too high to be acceptable for most uses.

Another current approach for providing multilingual support is to use a bilingual dictionary to map some foreign tokens to English and sending the English language output from the mapping to a monolingual model. Using such a mapping overcomes the latency issues of the previously described approach but introduces other significant shortcomings. This approach has low coverage of foreign language inputs, as only words that are included in the bilingual dictionary are supported. Another significant shortcoming is that this approach does not perform well for sentences. Important contextual information regarding the usage of the words within the sentences may be lost because the bilingual dictionary translates on a word-by-word basis. Furthermore, this approach can introduce significant memory overhead as a bilingual dictionary is needed for each language being supported.

The current approaches discussed above involve translating non-English language textual input to an English language input to be processed by the natural language processing model. Multilingual models trained to receive non-English languages as an input would eliminate the need to first translate the non-English language textual input. However, multilingual models need training data in the languages to be supported, and the amount of non-English training data is quite limited. Furthermore, creating additional labeled non-English training data is an extensive and labor-intensive process requiring human users to translate English language text to the corresponding non-English language text. Training data could be created by using machine translation to translate English language training data to one or more non-English languages, and the original labels from the English language training data may be inherited by the non-English language training data. But errors in machine translation models in translating the English language content to the non-English language content are carried over to the training data. As a result, multilingual models training using this approach may provide incorrect inferences from non-English language inputs.

For at least these reasons, the current approaches to providing multilingual support have numerous shortcomings that significantly impact the effectiveness of these approaches. Hence, there is a need for improved systems and methods that provide a technical solution for solving the technical problem of training multilingual natural language processing models.

SUMMARY

An example data processing system according to the disclosure may include a processor and a machine-readable medium storing executable instructions. The instructions when executed cause the processor to perform operations including obtaining first textual content in a first language from a first client device; determining that the first language is supported by a first machine learning model; obtaining a guard list of prohibited terms associated with the first language responsive to determining that the first language is supported; determining that the textual content does not include one or more prohibited terms associated with the first language based on the guard list; providing the first textual content as an input to the first machine learning model responsive to the textual content not including the one or more prohibited terms; analyzing the first textual content with the first machine learning model to obtain a first content recommendation, the first machine learning model being trained to receive a textual input and to output a recommendation for non-textual content based on the textual input; obtaining a first content recommendation policy associated with the first language that identifies content associated with the first language that may not be provided as a content recommendation; determining that the first content recommendation is not prohibited by the first content recommendation policy; and providing the first content recommendation to the first client device.

An example method implemented in a data processing system for providing content recommendations based on a multilingual natural language processing model includes obtaining first textual content in a first language from a first client device; determining that the first language is supported by a first machine learning model; obtaining a guard list of prohibited terms associated with the first language responsive to determining that the first language is supported; determining that the textual content does not include one or more prohibited terms associated with the first language based on the guard list; providing the first textual content as an input to the first machine learning model responsive to the textual content not including the one or more prohibited terms; analyzing the first textual content with the first machine learning model to obtain a first content recommendation, the first machine learning model being trained to receive a textual input and to output a recommendation for non-textual content based on the textual input; obtaining a first content recommendation policy associated with the first language that identifies content associated with the first language that may not be provided as a content recommendation; determining that the first content recommendation is not prohibited by the first content recommendation policy; and providing the first content recommendation to the first client device.

An example machine-readable medium on which are stored instructions. The instructions when executed cause a processor of a programmable device to perform operations of obtaining first textual content in a first language from a first client device; determining that the first language is supported by a first machine learning model; obtaining a guard list of prohibited terms associated with the first language responsive to determining that the first language is supported; determining that the textual content does not include one or more prohibited terms associated with the first language based on the guard list; providing the first textual content as an input to the first machine learning model responsive to the textual content not including the one or more prohibited terms; analyzing the first textual content with the first machine learning model to obtain a first content recommendation, the first machine learning model being trained to receive a textual input and to output a recommendation for non-textual content based on the textual input; obtaining a first content recommendation policy associated with the first language that identifies content associated with the first language that may not be provided as a content recommendation; determining that the first content recommendation is not prohibited by the first content recommendation policy; and providing the first content recommendation to the first client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
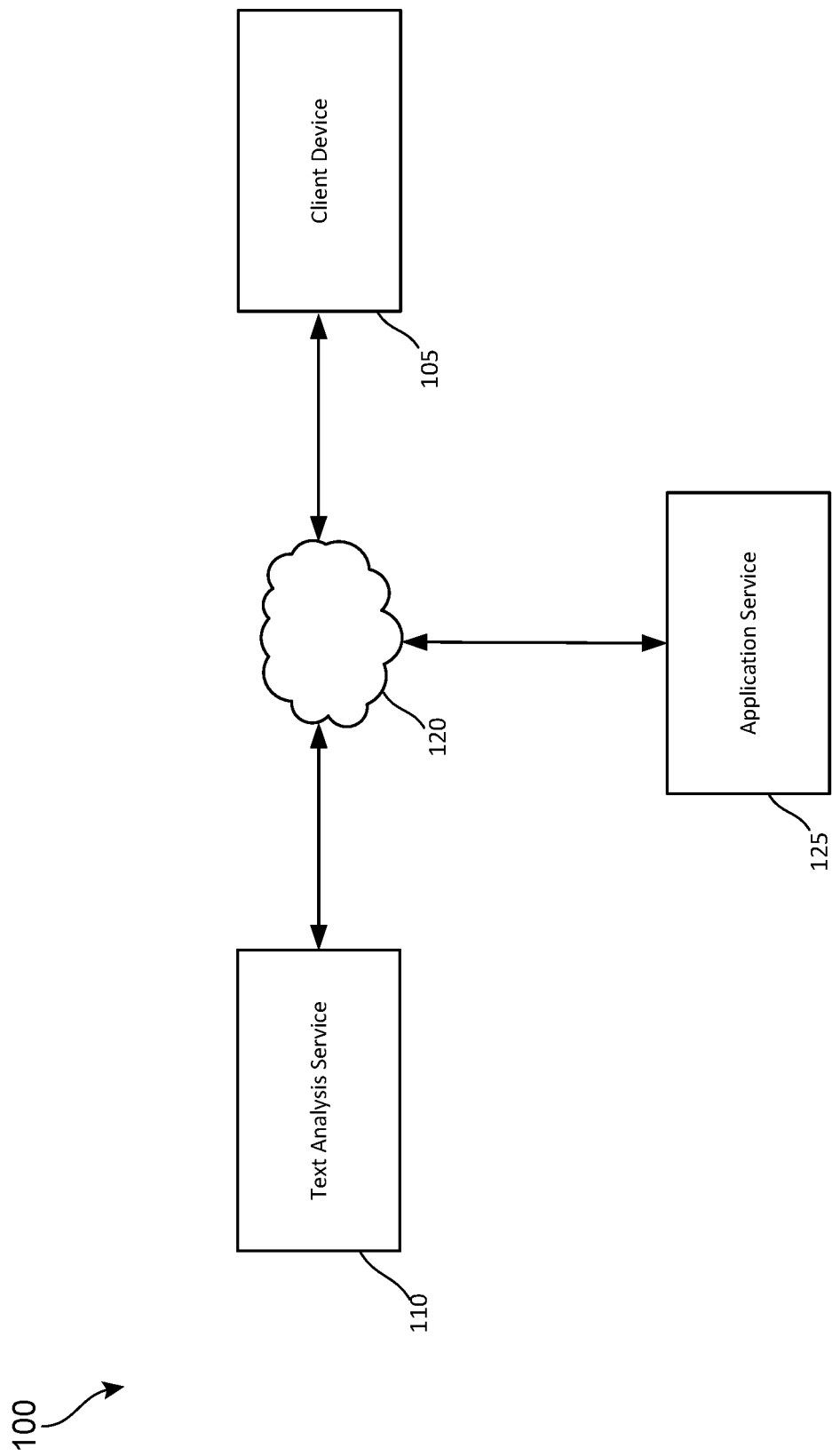
FIG. 1 is a diagram showing an example computing environment in which the techniques disclosed herein may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for providing content recommendations using multilingual natural language processing (NLP) models presented herein provide a technical solution for solving the technical problem of providing fast and accurate NLP models that can process multiple languages to support a global userbase. These techniques may be used to provide content recommendations for textual content in multiple languages using multilingual NLP models trained to analyze the textual content and to provide content recommendations based on that textual content. The textual content may be content from a document, slide, social media post, chat message, and/or other textual content. The content recommendations may include but are not limited to icons, images, videos, audio content, emoticons, and/or other non-textual content that may be used to supplement the textual content provided by the user. The specific types of textual content that may be supported and the types of recommendations may depend, at least in part, on the type of application in which the textual content is to be used.

The techniques herein provide fine-grained, language-specific policy-based control over the types of textual inputs for with content recommendations are provided and over the types of content recommendations which may be provided. The policy-based controls over the textual input are implemented using a language-specific guard list that includes prohibited terms that may be deemed to be offensive in a particular language or dialect of a language. The textual content received is compared with the terms included on the guard list to identify potentially offensive content. The guard list may include multiple severity levels. No content recommendations are provided for textual content including terms included in the top severity level for each language, while content recommendations may be provided for textual content that includes terms included in the lower severity levels. If the textual content is acceptable and does not include any prohibited language, the textual content may be provided as an input to one or more multilingual NLP models to obtain content recommendations. The content recommendations are also analyzed using language-specific policy information that determines whether the content recommendations provided by the multilingual NLP models are suitable to be presented to users.

A technical benefit of these language-specific policy controls is that textual inputs which may contain offensive terms in certain languages or dialects of languages may be identified in the policies for these languages or dialects to prevent content recommendations from being made on potentially offensive content. Another technical benefit of these techniques is that the content recommendations provided by the multilingual NLP model may also be checked to ensure that they meet accuracy thresholds and do not contain any content recommendations that may include potentially offensive content. Languages that may not yet be fully supported by the multilingual NLP models or for which the multilingual NLP models may still being tested may be more strictly monitored to ensure that the model does not provide potentially inaccurate content recommendations in addition to screening for potentially offensive results. Consequently, the multilingual content recommendation techniques provided herein may provide high quality content recommendations for textual inputs in multiple languages. These and other technical benefits of the techniques disclosed herein will be evident from the discussion of the example implementations that follow.

Figure 8:
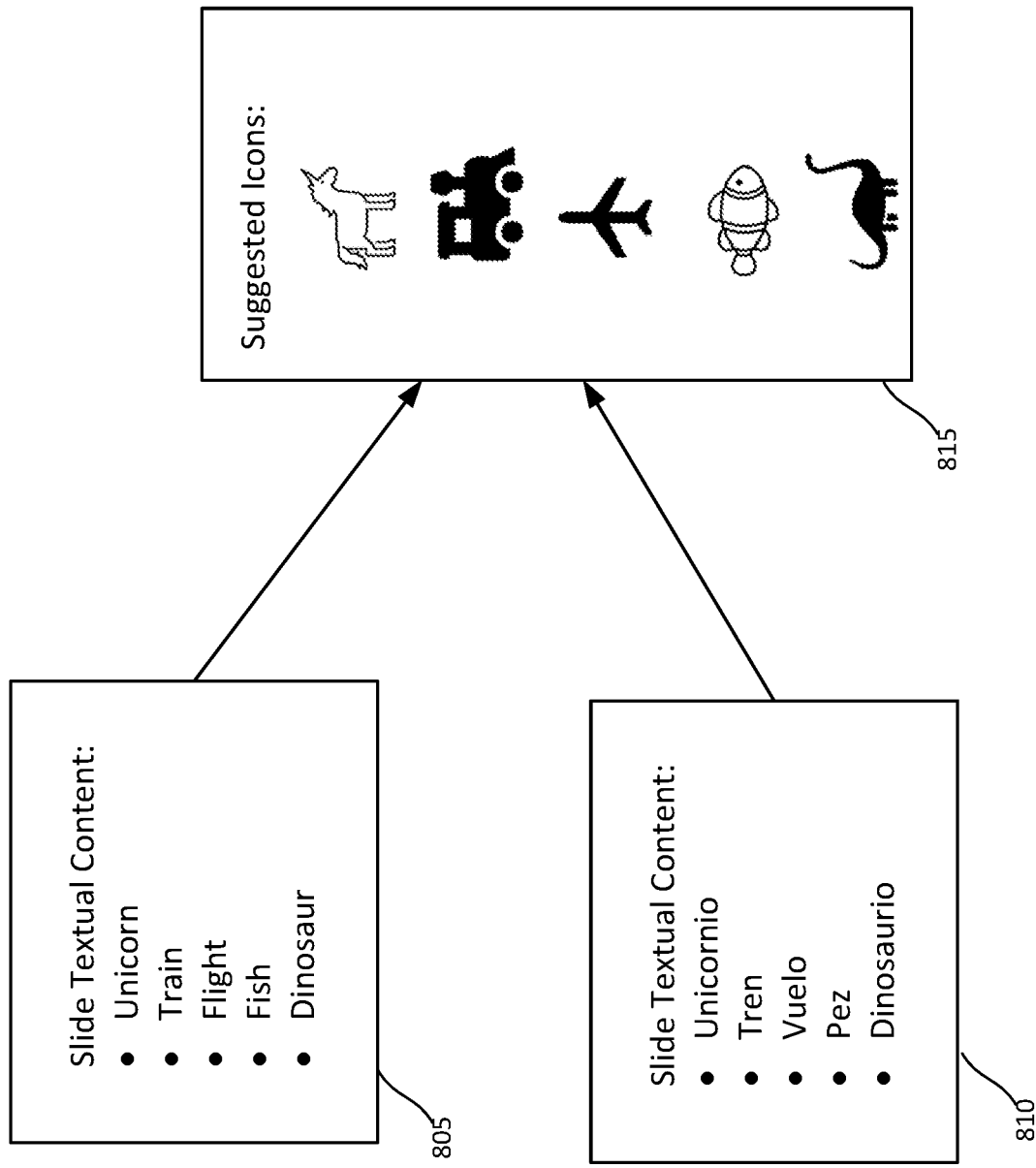
FIG. 8 shows an example a text-to-icon content recommendation model being applied to slide contents in two languages.

FIG. 8 shows an example a text-to-icon model being applied to slide contents in two languages. The slide contents 805 are in English and the slide contents 810 are in Spanish. The suggested icons 815 provided by the multilingual text-to-icon model are identical because the model has been trained to recognize both English and Spanish words. The example shown in FIG. 8 is merely to demonstrate the premise of the multilingual models that may be used by the text analysis service 110 and only uses single word inputs. However, the multilingual models trained using the techniques provided herein may be configured to recognize not only words, but also phrases and/or sentences in multiple languages and to provide contextual information that may be used to provide various services to the application provided by the application service 125. These services may include but are not limited to suggesting images, icons, videos, emojis, backgrounds, and/or audio content that may be added to the slide design for the slide designer provided by the application service 125. Other types of NLP models may be implemented that provide other types of outputs based on the interpretation of the textual input received by the text analysis service 110. Furthermore, the application service 125 is not limited to a presentation application that includes a slide designer service. The application service 125 may utilize other types of multilingual NLP models to provided services based on the textual content provided by users in the languages in which the multilingual models have been trained. For example, the text analysis service 110 may include NLP models for performing other services, such as but not limited to answering questions, implementing a conversational agent that may be configured to interact a human user, or document understanding. Furthermore, the content recommendation techniques provided herein may be used with other types of applications, such as but not limited to collaboration platforms, messaging applications, social media applications, and/or other types of applications where content recommendations may be desirable based on textual input.

FIG. 1 is a diagram showing an example computing environment 100 in which the techniques disclosed herein for providing content recommendations using multilingual NLP models may be implemented. The computing environment 100 may include a text analysis service 110. The example computing environment 100 may also include a client device 105 and an application service 125. The client device 105 may communicate with the text analysis service 110 and/or the application service 125 via the network 120.

In the example shown in FIG. 1, the text analysis service 110 is implemented as a cloud-based service or set of services. The text analysis service 110 may be configured to receive a request to analyze textual content from the client device 105 and/or the application service 125. The text analysis service 110 may include one or more NLP models that are configured to analyze the textual input and provide an output based on the textual input based on a contextual analysis of the textual input. The NLP models provided by the text analysis service 110 may depend upon the services offered by the application service 125.

In the example implementation shown in FIG. 1, the application service 125 may be a presentation design application, such as but not limited to Microsoft PowerPoint. The application service 125 may include a design recommendation service that provides suggestions for improving the design and layout of the presentation slides. The application service 125 may be configured to send textual content of a slide or slides to the text analysis service 110 for analysis, and the text analysis service 110 may analyze the textual content of the slide or slides using one or more NLP models. The NLP models may be multilingual models trained to support multiple languages.

Each of the multilingual NLP models provided by the text analysis service 110 may be trained to provide a specific type of content recommendations as an output that may be provided to the application service 125. Some examples of the types of NLP models that the application service may provide include but are not limited to a text-to-image model, a text-to-video model, a text-to-emoji model, a text-to-icon model, and/or other NLP models that may be configured to suggest content elements based on the textual input. In some implementations, a single NLP model may be trained to provide recommendations of more than one type of content in response to textual inputs.

The content recommendations output by the NLP model or models may be provided to the application service 125 for presentation to the user. The application service 125 may provide a user interface for displaying the content recommendations and for allowing the user to select suggested content elements to add to a slide or slides to improve the layout and or design of the slides.

The client device 105 is a computing device that may be implemented as a portable electronic device, such as a mobile phone, a tablet computer, a laptop computer, a portable digital assistant device, a portable game console, and/or other such devices. The client device 105 may also be implemented in computing devices having other form factors, such as a desktop computer, vehicle onboard computing system, a kiosk, a point-of-sale system, a video game console, and/or other types of computing devices. While the example implementation illustrated in FIG. 1 includes one client device, other implementations may include multiple client devices that may utilize the application service 125. Furthermore, in some implementations, the application functionality provided by the application service 125 may be implemented by a native application installed on the client device 105, and the client device 105 may communicate directly with the text analysis service 110 over a network connection.

In the example shown in FIG. 1, the text analysis service 110 is shown as a cloud-based service that may be accessed over a network. However, other implementations of the text analysis service 110 may be achieved by the application service 125 or by the client device 105. For example, the application service 125 may implement an application that is configured to receive textual inputs, to analyze the textual input using the multilingual NLP models provided herein, and to provide content recommendations based on the textual inputs. In other implementations, the functionality of the text analysis service 110 and/or the application service 125 described herein may be carried out on the client device 105.

Figure 2:
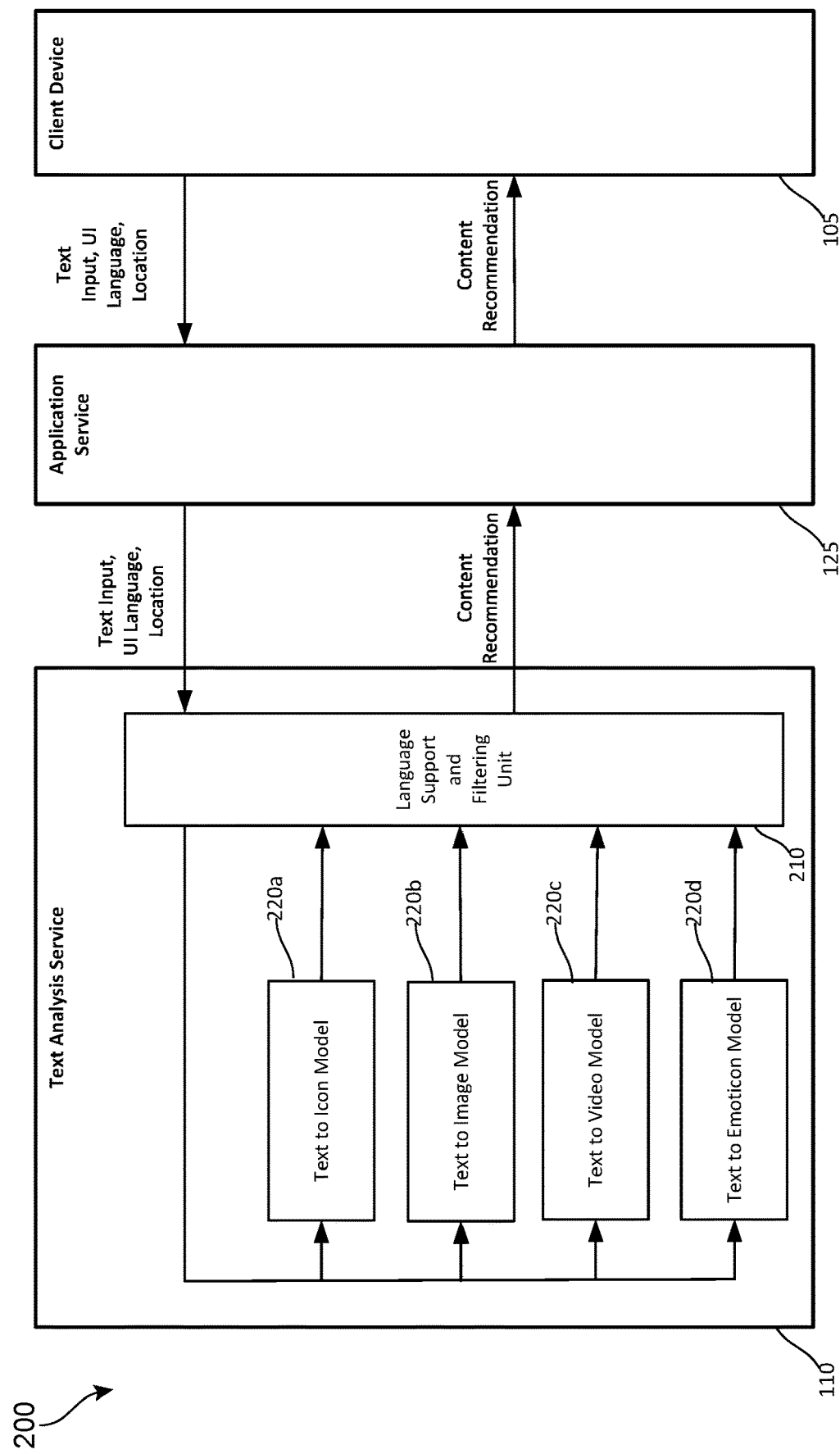
FIG. 2 is an example architecture that may be used, at least in part, to implement the text analysis service shown in FIG. 1.

FIG. 2 is an example architecture 200 that may be used, at least in part, to implement the text analysis service 110. The architecture 200 may include an implement a implement a language support and filtering unit 210 and one or more multilingual content recommendation models, such as the multilingual NLP models 220a-220d shown in FIG. 2. The multilingual NLP models 220a-220d are each trained to support multiple languages and to provide a specific type of content recommendation, such as but not limited to an icon, an image, video, audio, or emoticon. The NLP models 220a-220d may be trained to support the same set of languages. However, the accuracy of the predictions associated with each language may vary. Certain languages may have more and/or better training data available, and the NLP models 220a-220d may provide more accurate predictions for those languages. Furthermore, many languages have regional variations, and the accuracy of the predictions by the NLP models 220a-220d may vary depending upon the region. The predictions by the NLP models 220a-220d for specific languages and/or regional dialects may be improved over time as training data is obtained for those languages and/or regional dialects.

As will be discussed in greater detail in the examples which follow, the language support and filtering unit 210 may be configured to support multiple NLP models and/or multiple versions of the NLP models. The language support and filtering unit 210 may also be configured to provide policy-based, per-language filtering based on terms included in the textual input, the content recommendations provided by an NLP model, a prediction certainty value representing an accuracy of the prediction by the NLP model, and/or other factors.

The language support and filtering unit 210 may also support policy-based limitations on geographical region and/or dialect. Certain terms and/or content recommendations may be offensive or inappropriate in certain geographical areas and/or in certain dialects of a language. The language support and filtering unit 210 may implement these techniques by analyzing the textual input provided by the user at the client device 105, the user interface (UI) language selected by the user, and location information identifying a geographical location of the client device 105 from which the request originated. The application service 125 may receive this information from the client device 105 and provide this information to the text analysis service 110 with a request to analyze the textual input and provide content recommendations. The language support and filtering unit 210 may analyze the textual input and other information provided to determine a language of the textual input and/or regional dialect, if applicable. The language support and filtering unit 210 may then access the appropriate language-specific policy information and determine whether the language is supported and whether the textual input includes any prohibited terms associated with the language. No content recommendation will be made if the language is not supported and/or if the textual input includes any prohibited terms. Otherwise, the language support and filtering unit 210 may selectively provide the textual input to one or more of the NLP models 220a-220d based on the policy information and analyze the content recommendations provided by the selected models to determine whether there are any policy-based reasons for suppressing the output recommendations. If there are no reasons to suppress the output recommendations, the language support and filtering unit 210 may cause the text analysis service 110 to provide the content recommendations to the application service 125. The application service 125 may then provide the content recommendations to the client device 105. The client device 105 may present the content recommendations to a user of the device 105 via a user interface configured to allow the user to select one or more of the content recommendations to be integrated into a document, slide, social media post, chat message, and/or other textual content which the user is working on in the application. In some implementations, the text analysis service 110 may provide the content recommendations directly to the client device 105.

Figure 3:
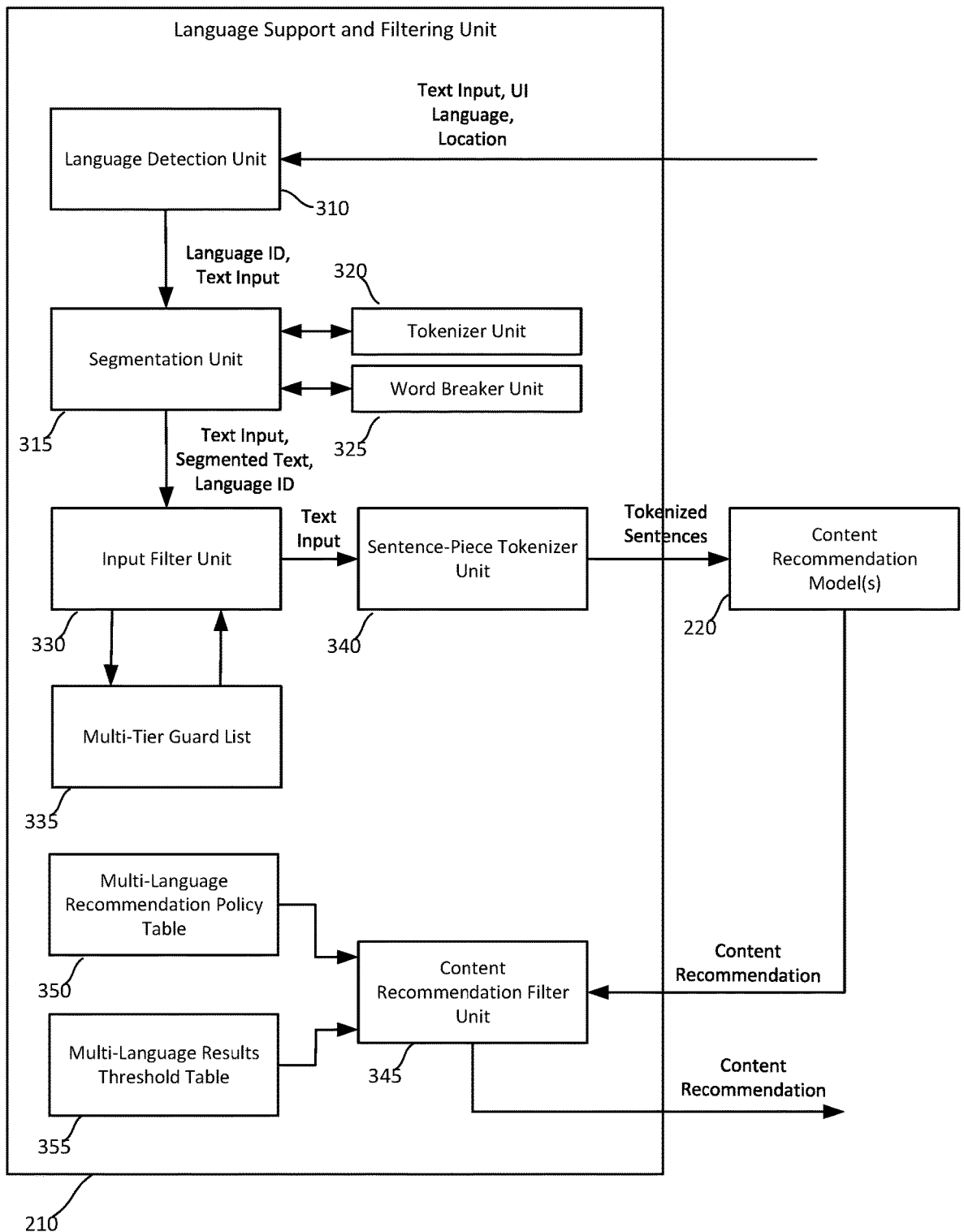
FIG. 3 is a diagram of an example implementation of the language support and filtering unit shown in FIG. 2.

FIG. 3 is diagram of any example implementation of the language support and filtering unit 210 of the text analysis service 110. The language support and filtering unit 210 may include a language detection unit 310, a segmentation unit 315, a tokenizer unit 320, a word breaker unit 325, an input filter unit 330, a multi-tier guard list 335, a sentence-piece tokenizer unit 340, a content recommendation filter unit 345, a multi-language recommendation policy datable 350, and a multi-language recommendation threshold table 355.

The language detection unit 310 is configured to receive the text input, the UI language, and the location information from the application service 125. As indicated above, the text input is the textual content input by a user of the client device 105, the UI language information represents a language setting indicating which language the user interface of the application on the client device 105 is set to display text and/or perform other actions, and the location is a geographical location of the client device 105. The location information may include a precise geographical location of the user or may include coarse geographical information, such as country or region in which the client device 105 is located. The precision of the location information may be limited by user privacy settings on the client device 105. However, even a coarse geographical location may be sufficient to determine whether the text input may be provided in a regional dialect of a language.

The language detection unit 310 may be configured to provide the text input, the UI language, and the location information to a machine learning model or models trained to receive such inputs and to output a prediction of the language of the content of the text input. The machine learning model or models may be trained to predict that the language is a regional dialect of the language based on the UI language and the location information. The language detection unit 310 may be configured to send a request with the text input, UI language, and location information to a third-party service that is configured to analyze textual inputs to determine a language of the text input and provide a prediction of the language of the textual input in response to the request.

The language detection unit 310 may also be configured to determine whether the identified language is supported by the text analysis service 110. The language detection unit 310 may access supported language information from persistent memory of the text analysis service 110. The supported language information may be updated by an administrator as changes are made to the languages supported by the text analysis service 110. If the language of the text input is not supported, then no content recommendation is provided for the text input. Otherwise, the language detection unit 310 may provide a language identifier for the language and the text input to a segmentation unit 315.

The segmentation unit 315 may be configured to determine whether the language is a continuous script language. Continuous script languages do not include breaks or spaces between words. Japanese, Chinese, Korean, and Thai are a few examples of languages that do include breaks or spaces between words. The segmentation unit 315 may be configured to provide text inputs in such continuous script languages to the word breaker unit 325 to analyze the text inputs and break the text into separate words. Text inputs in non-continuous script languages, such as but not limited to English, French, Spanish, and Portuguese, may be provided to the tokenizer unit 320. Both the word breaker unit 325 and the tokenizer unit 320 may be configured to return segmented text. The segmented text includes a list of words in the order that the words appear in the text input. The word breaker unit 325 and/or the tokenizer unit 320 may be implemented by as a third-party service implemented externally to the text analysis service 110, and the text analysis service 110 may send a request to a tokenizer service or word breaker service to obtain the segmented version of the text input. The segmentation unit 315 may provide the text input, the segmented text output by the tokenizer unit 320 or word breaker unit 325, and the language ID to the input filter unit 330.

The input filter unit 330 may be configured to access the multi-tier guard list 335 and analyze the segmented text received from the segmentation unit 315. The multi-tier guard list 335 may include a list of prohibited words for each of the languages supported by the text analysis service 110. The multi-tier guard list 335 may include a set of high severity words and a set of low severity prohibited words for each of the supported languages. The high severity words for a particular supported language are words that are considered offensive in any context for that language. The low severity words are words that may considered to be offensive in some contexts and/or in some dialects of a language. For example, certain words or phrases may be offensive in certain dialects of a language but not in other dialects of that language. Furthermore, certain words or phrases may be offensive in certain geographical areas in which a particular language is spoken but not in other geographical areas. The low severity words may also be associated with a category of word, such as but not limited to "drugs" or "guns." Certain categories of words may be considered offensive in some geographical areas but not in other areas. The guard list may indicate the geographical areas where no content suggestions should be provided for words that may be considered offensive in those areas. The guard list for each language may be updated periodically by a team of linguists skilled in that language. The team of linguists may include members who are familiar with differences in regional dialects and who are familiar with changing views of the usage of certain words or phrases based on changing usage current events, politics of the regions in which the language is used, and other factors which may change how the usage of certain words are used.

The input filter unit 330 may be configured to determine whether the segmented text includes at least one of the high-severity prohibited words and to end processing of the text input responsive to detecting at least one of the high-severity prohibited words in the text input. If the input filter unit 330 determines that the segmented text includes no high severity prohibited words for the language of the input text but detects a low severity prohibited word, the input filter unit 330 may use the location information associated obtained from the client device 105 to determine whether the low severity prohibited word is prohibited in the geographical area in which the client device 105 is located. If low severity prohibited word is prohibited in the geographical area of the client device 105, the input filter unit 330 may end processing of the text input. No content recommendation is provided where a word or phrase included in the text input may be found offensive to avoid offending users and to the NLP models creating used by the text analysis service 110 of an associated between these prohibited words and any content recommendation. Otherwise, if no high severity word or geographical problematic low severity words were included in the text input, the input filter unit 330 may provide the text input to the sentence-piece tokenizer unit 340 for processing.

The sentence-piece tokenizer unit 340 may be configured to pre-process the input text using a sentence-piece tokenizer model that is language independent prior to generate the input for the content recommendation models 220. The sentence-piece tokenizer may use a SentencePiece model described by Kudo et al. to pre-process the input text.

The content recommendation models 220 may be one or more NLP content models configured to provide content recommendations based on the text input received. As discussed with respect to FIG. 2, the content recommendation models 220 may include separate models for generating recommendations for different content types or a single model may be configured to provide multiple types of content recommendations. The content recommendations output by the content recommendation models 220 may be provided to the content recommendation filter unit 345.

The content recommendation filter unit 345 may be configured to analyze the content recommendations provided by the content recommendation models 220. The content recommendation filter unit 345 may be configured to access the multi-language recommendation policy table 350 and the multi-language results threshold table 355 to obtain information that may be used to determine whether the content recommendations output by the content recommendation models 220 may be provided to the application service 125 or the client device 105. The multi-language recommendation policy table 350 may include information that indicates that certain images, videos, icons, emojis, or other types of content should be blocked for each language supported by the text analysis service 110. Each type of content may be associated with specific content and/or types of content that may not be provided as a recommendation, because the specified content and/or type of content may be deemed offensive. For example, images depicting nudity, violence, drug usage, and/or other specified types of content may be identified as being blocked. The multi-language recommendation policy table 350 may identify specific content as well as types of content recommendations that should not be output by the text analysis service 110. For example, the multi-language recommendation policy table 350 may include a filename, link, network address, or other references to a specify content items that should not be provided as a content recommendations.

The multi-language recommendation policy table 350 may also implement policies on a per-model basis for the content recommendation models 220. Multiple version of the content recommendation models 220 may be under development. When a model is initially released for usage by the text analysis service 110, stricter limits may be placed on specific content recommendations and/or types of content recommendations that may be provided to users of the text analysis service 110. Over time, as the model has been tested and shown to perform as expected, the limits on the specific content recommendations and/or types of content recommendations that may be provided to users of the text analysis service 110 may be relaxed.

The content recommendation filter unit 345 may be utilize the policies provided in the multi-language recommendation policy table 350 to assess whether each of the recommendations provided as output by the content recommendation models 220 should be permitted to be presented to a user or suppressed. The content recommendation filter unit 345 may use metadata associated with the content recommendation and/or analyze the content recommendations using various matching algorithms and/or models to determine whether a content recommendation is a specific content item or type of content item that should be suppressed. If the content recommendation should be suppressed, then no recommendation is presented to the user. Otherwise, the content recommendation filter unit 345 may also check whether the content recommendation should be suppressed based on the The content recommendation filter unit 345 may access the multi-language results threshold table 355 to obtain information that may be used to determine whether the content recommendations output by the content recommendation models 220 are sufficiently accurate to present to users. The content recommendation models 220 may include multiple content recommendation models for which the models may provide varying levels of prediction quality. Training data may be difficult and/or expensive to obtain for certain languages. Thus, the recommendation models may not provide content recommendations for certain languages. The content recommendation filter unit 345 may be configured to determine whether a prediction certainty value associated with the first content recommendation exceeds a particular threshold value associated with the language of the text input. The content recommendation models 220 may be configured to generate the prediction certainty value with the content recommendations in some implementations. In other implementations, the prediction certainty value may be determined through testing and set for all recommendations made by a particular content recommendation model and language. The prediction certainty values determined through testing may improve over time as the content predictions provided by the models are refined.

The content recommendation filter unit 345 may suppress the content recommendations provided by the content recommendation models 220 if the content recommendation includes content that should be suppressed, the prediction certainty value does not satisfy the language-specific threshold, or both. Otherwise, the content recommendation filter unit 345 may output the content recommendations to the application service 125 or the client device 105.

Figure 4:
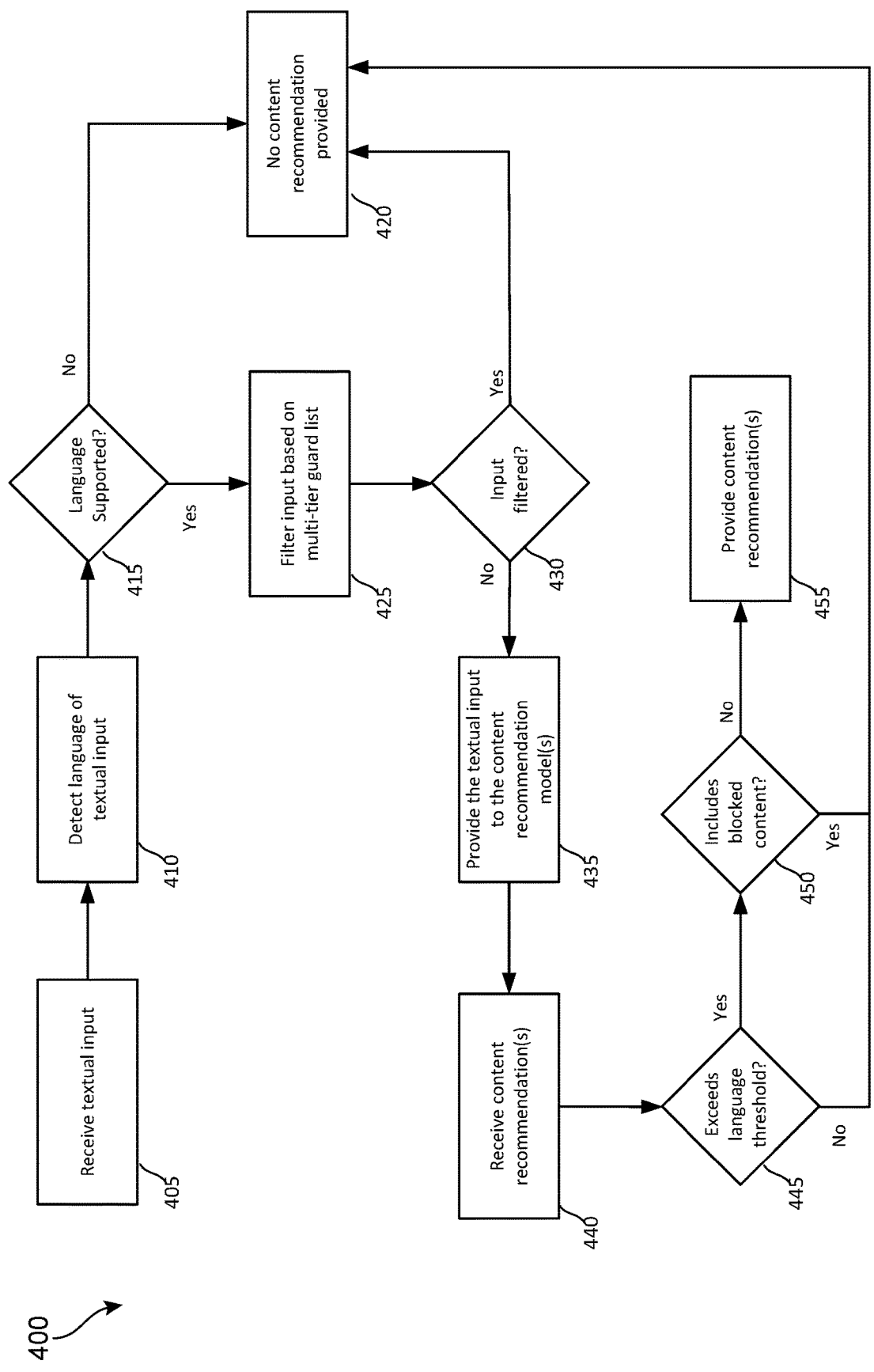
FIG. 4 is a flow diagram of a process for providing content recommendation that may be implemented by the language support and filtering unit shown in FIGS. 2 and 3.

FIG. 4 is an example flow chart of an example process 400 that may be implemented by the language support and filtering unit 210 of the text analysis service 110. The process 400 shows an example of the processing that may be performed by the language support and filtering unit 210 as shown in the FIG. 3.

The process 400 may include an operation 405 of receiving textual input. The textual input may be received by the text analysis service 110 and provided to the language support and filtering unit 210 for analysis. The type of textual input may vary depending upon the application services provided by the application services 125. The textual input may be a document, a slide, a social media post, a chat message, and/or other textual content which the user is working on in the application provided by or supported by the application service 125.

The process 400 may include an operation 410 of detecting a language of the textual input. The language detection unit 310 of the text analysis service 110 may analyze the text input to determine the language used in the textual input. The text analysis service 110 may support many languages, and the input filter unit 330 may make a determination whether the language is supported by the text analysis service 110. The textual input may be segmented by the segmentation unit 315 to facilitate processing by the input filter unit 330.

The process 400 may include an operation 415 of determining whether the detected language is supported. The language detection unit 310 of the language support and filtering unit 210 may determine whether a particular language is supported by the text analysis service 110. If the language detected in the textual input is not supported, the process 400 may end with operation 420 in which no content recommendation is provided to the client device 105 or the application service 125. If the language is unsupported, the content recommendation models 220 will not be able to provide an accurate content recommendation. Accordingly, no recommendation is provided to prevent incorrect inferences by the model from being reinforced. Otherwise, if the language is supported, the process 400 may continue with operation 425.

The process 400 may include an operation 425 of filtering the textual input based on a multi-tier guard list. The input filter unit 330 may access the multi-tier guard list 335 and analyze the textual input to determine whether any prohibited terms have been used in the textual input as described with respect to FIG. 3. The process may include an operation 435 of determining whether the textual input should be filtered based on the multi-tier guard list 335. If a high severity prohibited term or geographically problematic low severity term is detected in the textual input, the process 400 may end with operation 420 in which no content recommendation is provided to the client device 105 or the application service 125.

The process 400 may include an operation of providing the textual input to one or more content recommendation models 220. The text analysis service 110 may provide multiple content recommendation models that may be used to analyze textual content and provide content recommendations that may be relevant to the text input. The content recommendation may be various types of content, such as but not limited to an icon, an image, video, audio, an emoticon, or other type of content. In some implementations, a single content recommendation model may be configured to provide recommendation that may include more than one type of content recommendation, while other implementation may include machine learning models that are configured to provide recommendations for only a single type of content.

The process 400 may include an operation 440 of receiving one or more content recommendations from the one or more content recommendation models 220. The content recommendations, if any, provided by the one or more content recommendation models 220 may be received by the language support and filtering unit 210 for further processing.

The process 400 may include an operation 445 of determining whether the one or more content recommendations are associated with a prediction certainty value that exceeds a threshold for the language detected in operation 410. As discussed in the preceding examples, each of the content recommendations may be associated with a prediction certainty value that represents an estimated accuracy of the content recommendation. The prediction certainty may be lower for languages for which the content prediction model has not been fully trained for that language. The content recommendation filter unit 345 may access the multi-language results threshold table 355 to obtain the thresholds associated with the language of the textual input and/or content recommendation models that generated the content recommendations. If the content recommendation filter unit 345 determines that a content recommendation is associated with a prediction certainty that does not meet or exceed the threshold value, the process 400 may end with operation 420 in which no content recommendation is provided to the client device 105 or the application service 125. Otherwise, the process 400 may continue with operation 450. If multiple content recommendations have been received from the one or more content recommendation models 220, the process 400 may continue with operation 450 for those content recommendations that are associated with a prediction certainty value that meets or exceeds the respective threshold value obtained from the multi-language results threshold table 355.

The process 400 may include an operation 450 of determining whether the one or more content recommendations include blocked content. As discussed in the preceding example, the content recommendation filter unit 345 may access the multi-language recommendation policy table 350 to determine whether any of the one or more content recommendations include blocked content. If the content recommendation filter unit 345 determines that a content recommendation includes blocked content, the process 400 may end with operation 420 in which no content recommendation is provided to the client device 105 or the application service 125. Otherwise, the process 400 may continue with operation 455. If multiple content recommendations have been received from the one or more content recommendation models 220, the process 400 may continue with operation 455 for those content recommendations that do not include blocked content.

The process 400 may include an operation 455 of providing the one or more content recommendations to a computing device that provided the textual input received in operation 405. The text analysis service 110 provides the content recommendations to the computing device that provided the textual input to the text analysis service 110 for processing. The computing device may be a computing device of the application service 125 or the client device 105 shown in the preceding examples.

Figure 5:
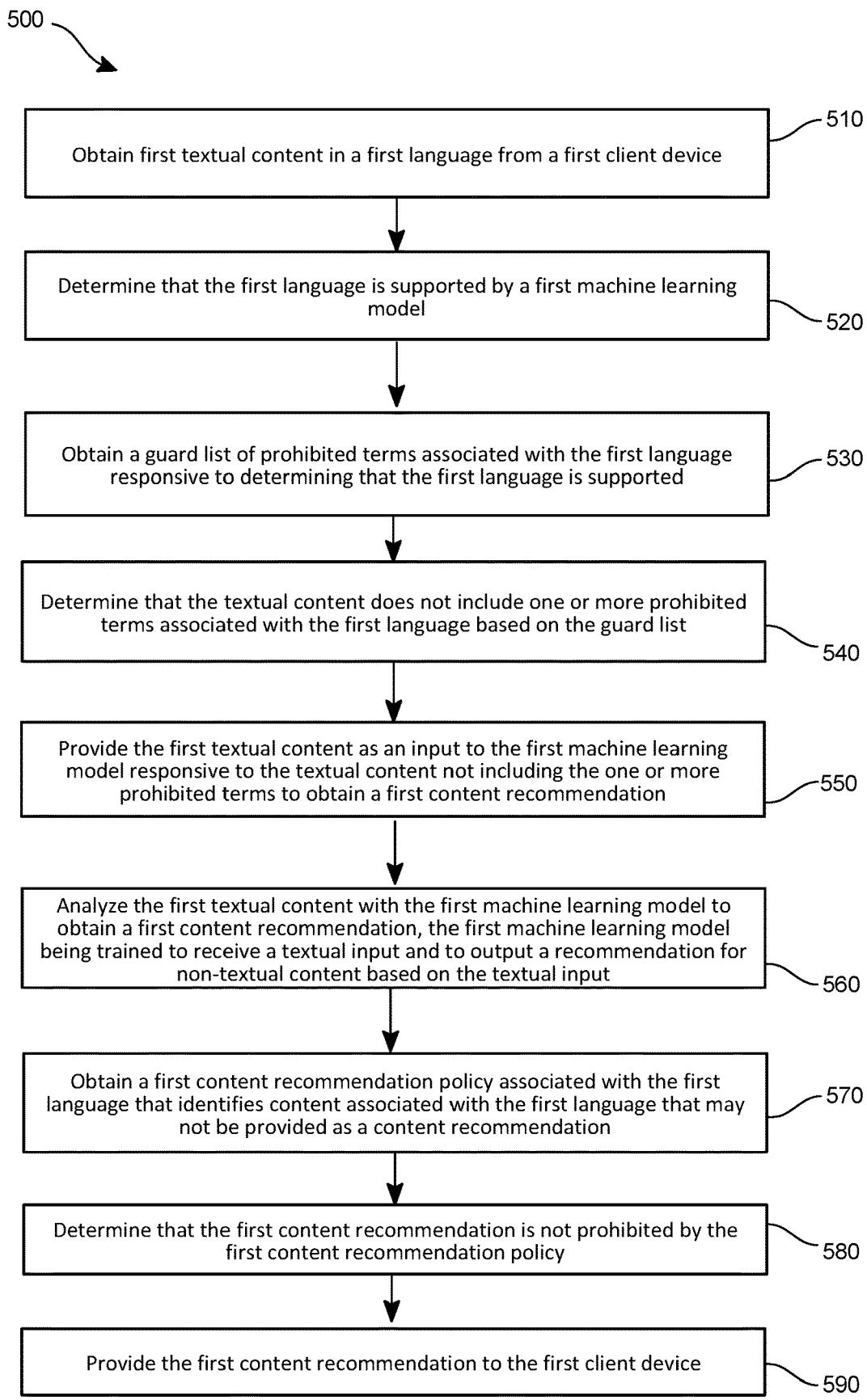
FIG. 5 is a flow diagram of another process for providing content recommendations that may be implemented by the language support and filtering unit.

FIG. 5 is a flow chart of an example process 500. The process 500 may be implemented by the language support and filtering unit 210 of the text analysis service 110.

The process 500 may include an operation 510 of obtaining first textual content from a first client device. The textual content may be received by the text analysis service 110 from a client device 105 directly or indirectly through the application service 125. The textual content may include various types of textual content as described in the preceding examples.

The process 500 may include an operation 520 of determining that the first language is supported by a first machine learning model. The language support and filtering unit 210 may include a language detection unit 310 that is configured to determine a language of the textual content obtained by the text analysis service 110. The language detection unit 310 may output an indication of the language of the textual content. The indication of the language may be used by the segmentation unit 315 to determine whether the language is a continuous script language or a non-continuous script language and to segment the language into a plurality of tokens for further analysis.

The process 500 may include an operation 530 of obtaining a guard list of prohibited terms associated with the first language responsive to determining that the first language is supported by the first machine learning model. As discussed in the preceding examples, the language support and filtering unit 210 may access the multi-tier guard list 335 to obtain language-specific policy information for the language identified by the language detection unit 310. The guard list may include terms that may be found to be offensive for a particular language or region The process 500 may include an operation 540 of determining, based on the guard list, that the textual content does not include one or more prohibited terms associated with the first language. The input filter unit 330 of the language support and filtering unit 210 may analyze the textual input to determine whether the textual content includes any high severity and/or low severity terms for the first language as indicated by the guard list. As indicated by the preceding examples, the language support and filtering unit 210 may halt processing of the textual input if any high severity terms are identified and no content recommendation will be provided to the first client device. The language support and filtering unit 210 may perform additional processing if a low-severity term is identified to determine whether to halt processing based on various factors, such as the geographical area in which the client device The process 500 may include an operation 550 of providing the first textual content as an input to the first machine learning model responsive to the textual content not including the one or more prohibited terms. If the language support and filtering unit 210 determines that the first textual content does not include any prohibited words that preclude providing a recommendation, the language support and filtering unit 210 may provide the first textual content to a first content recommendation model, such as the content recommendation models 220, for analysis. In the process 500, a single content model is used, but other implementations may include multiple content recommendation models.

The process 500 may include an operation 560 of analyzing the first textual content with the first machine learning model to obtain a first content recommendation. The first machine learning model is trained to receive a textual input and to output a recommendation for non-textual content based on the textual input. The content recommendation may be an icon, an image, video, audio, an emoticon, or other type of content. In some implementations, the first machine learning model may be configured to provide recommendation that may include more than one type of content recommendation, while other implementation may include machine learning models that are configured to provide recommendations for only a single type of content.

The process 500 may include an operation 570 of obtaining a first content recommendation policy associated with the first language that identifies content associated with the first language that may not be provided as a content recommendation. The language support and filtering unit 210 may access the multi-language recommendation policy table 350 to obtain policy information that identifies certain content or types of content that should be blocked by the language support and filtering unit 210 and not provided as a content recommendation. As discussed in the preceding examples, the multi-language recommendation policy table 350 may be generated by a team of language specialists who may identify potentially offensive content. The multi-language recommendation policy table 350 may indicate that certain content should be blocked for certain languages, certain regional dialects, and/or certain geographical regions.

The process 500 may include an operation 580 of determining that the first content recommendation is not prohibited by the first content recommendation policy. The language support and filtering unit 210 may determine that the content recommendation obtained from the first machine learning model does not appear to contain any potentially offensive content.

The process 500 may include an operation 590 of providing the first content recommendation to the first client device. The first content recommendation may be provided to the first client device 105 either directly or through the application service 125.

The detailed examples of systems, devices, and techniques described in connection with FIGS. 1-5 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-5 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
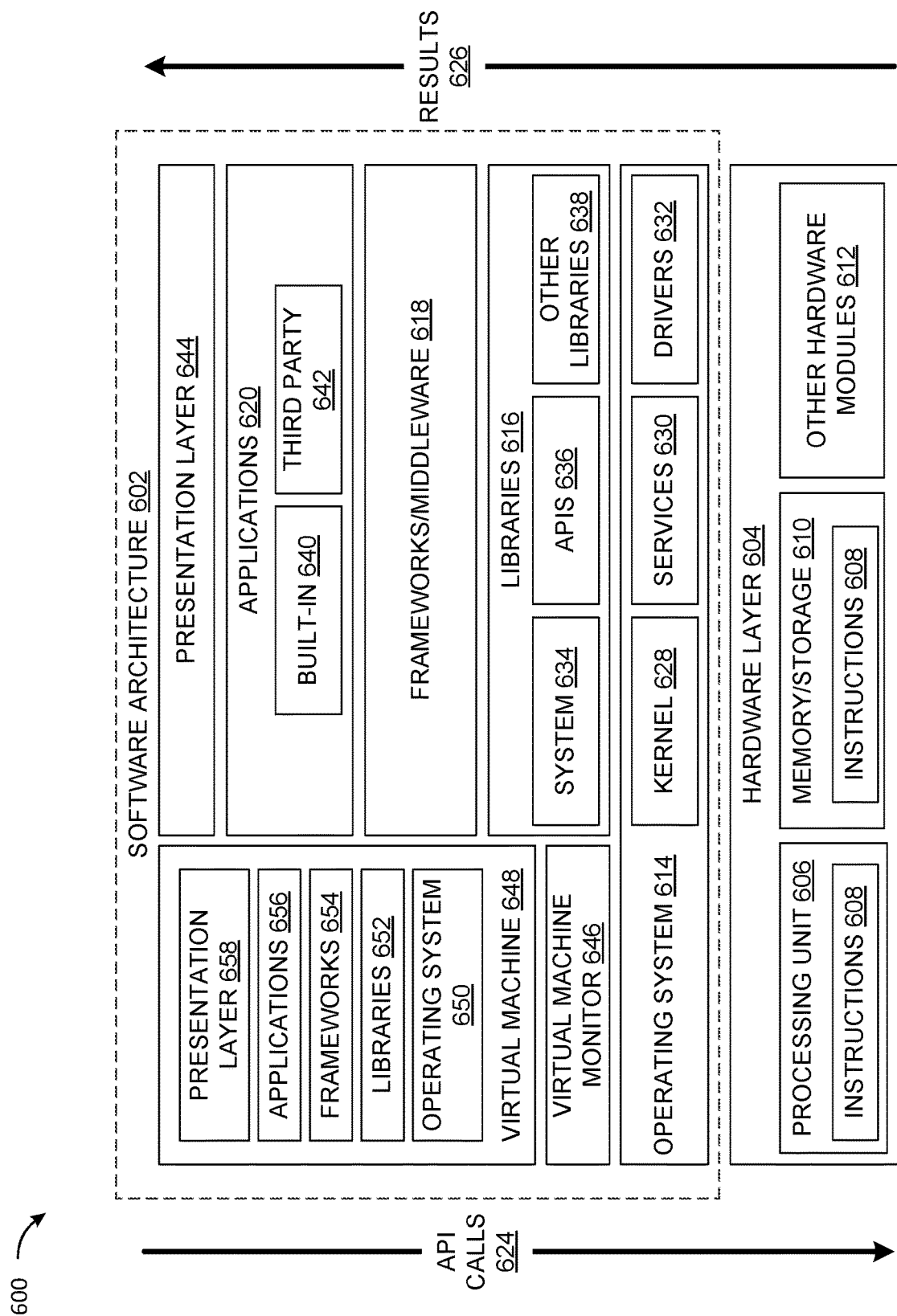
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
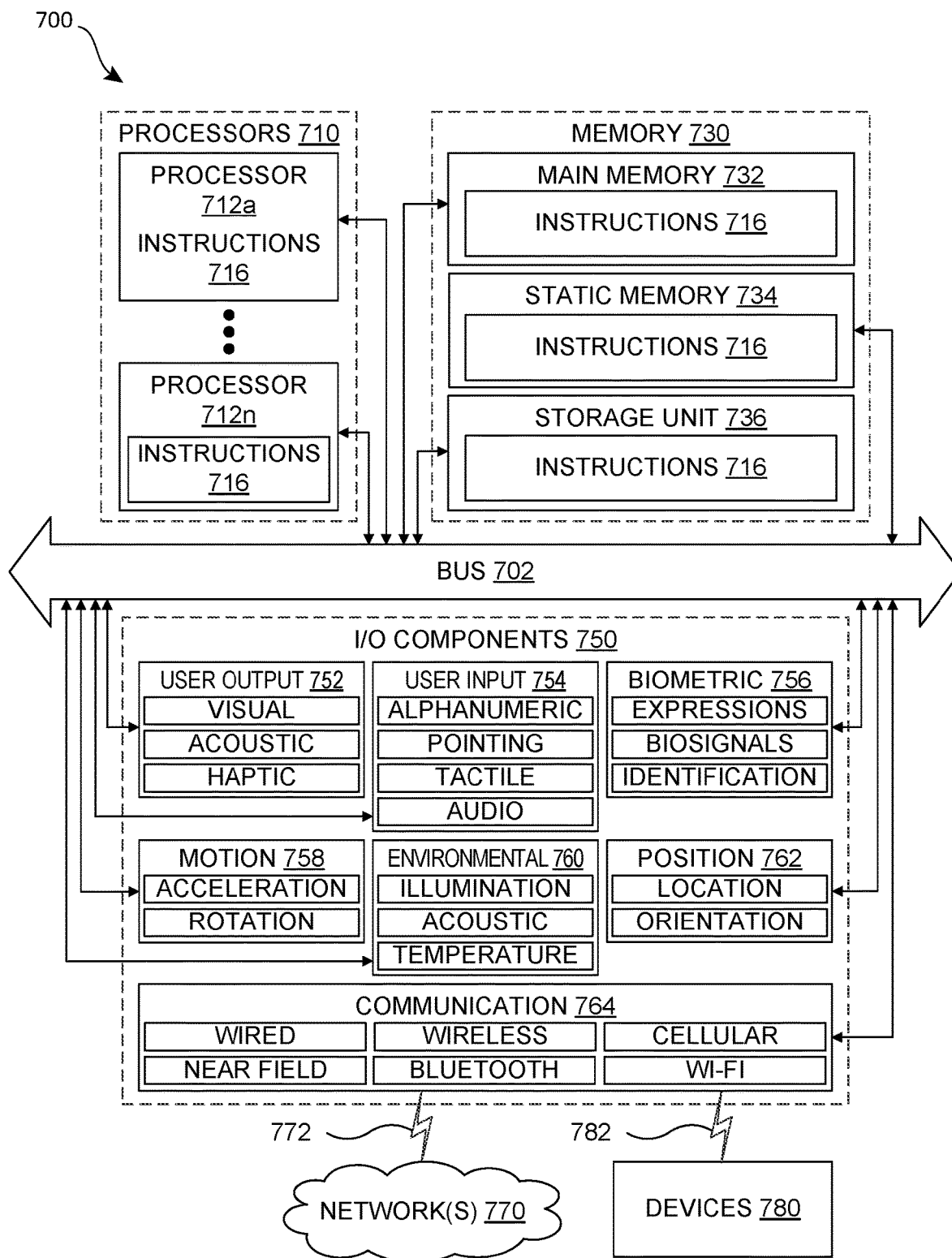
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof.

Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A multilingual content recommendation pipeline system that determines whether or not to make content recommendations for received textual content comprising:
   a processor; and
   a machine-readable storage medium storing executable instructions that, when executed, cause the processor to perform operations comprising:
   obtaining first textual content in a first language from a first client device;
   determining whether the first language is supported by a first machine learning model and performing one of:
      not making a content recommendation and ending operation of the pipeline, if the first language is determined not to be supported; or
      obtaining a guard list of prohibited terms associated with the first language responsive to determining that the first language is supported;
   determining whether the first textual content does not include one or more prohibited terms associated with the first language based on the guard list;
   providing the first textual content as an input to the first machine learning model responsive to the first textual content not including the one or more prohibited terms;
   responsive to determining that the first textual content includes the one or more prohibited terms, not making a content recommendation and ending operation of the pipeline,
   responsive to the first textual content not including the one or more prohibited terms, analyzing the first textual content with the first machine learning model to obtain a first content recommendation, the first machine learning model being trained to receive a textual input and to output a recommendation for non-textual content based on the textual input;
   obtaining a first content recommendation policy associated with the first language that identifies non-textual content associated with the first language that may not be provided as a content recommendation;
   determining whether the first content recommendation is not prohibited by the first content recommendation policy by analyzing the first content recommendation using one or more second machine learning models configured to determine whether the first content recommendation is prohibited by the first content recommendation policy, including determining whether a prediction certainty value associated with the first content recommendation satisfies a threshold associated with the first language;
   performing one of:
      responsive to determining that the first content recommendation is prohibited by the first content recommendation policy, not providing the first content recommendation to the first client device and ending the operation; or
      responsive to determining that the first content recommendation is not prohibited by the first content recommendation policy, providing the first content recommendation to the first client device.

2. The system of claim 1, wherein the guard list of prohibited terms further comprise a set of high severity terms and a set of low severity terms associated with the first language.

3. The system of claim 2, wherein the machine-readable storage medium includes instructions configured to cause the processor to perform operations of:
   determining that the first textual content includes at least one high severity term of the set of high severity terms; and providing no content recommendation to the first client device instead of the first content recommendation responsive to the textual content including the at least one high severity term.

4. The system of claim 2, wherein the machine-readable storage medium includes instructions configured to cause the processor to perform operations of:
    determining that the textual content includes no high severity term and a respective low severity term of the set of low severity terms;
    determining, based on a geographical area associated with the first client device, that the respective low severity term is prohibited in the geographical area; and
    providing no content recommendation to the first client device instead of the first content recommendation responsive to the respective low severity term being prohibited in the geographical area.

5. The system of claim 1, wherein to determine that the first content recommendation is not prohibited by the first content recommendation policy, the machine-readable storage medium includes instructions configured to cause the processor to perform operations of:
    determining a category of recommendation associated with the first content recommendation; and
    determining, based on a geographical area associated with the first client device, that the category of recommendation is not prohibited for the geographical area.

6. The system of claim 1, wherein to determine that the first content recommendation is not prohibited by the first content recommendation policy, the machine-readable storage medium includes instructions configured to cause the processor to perform operations of:
    obtaining a list of prohibited content items associated with the first language and respective geographical areas in which the list of prohibited content items are indicated to be offensive; and
    determining, based on a geographical area associated with the first client device and based on the list of prohibited content items, that the first content recommendation is not prohibited for the geographical area associated with the first client device.

7. A method implemented in a data processing system for providing a multilingual content recommendation pipeline that determines whether or not to make content recommendations for received textual content, the method comprising:
    obtaining first textual content in a first language from a first client device;
    determining whether the first language is supported by a first machine learning model and performing one of:
        not making a content recommendation and ending operation of the pipeline, if the first language is determined not to be supported;
        responsive to determining that the first language is supported, obtaining a guard list of prohibited terms associated with the first language responsive to determining that the first language is supported;
    determining whether the first textual content does not include one or more prohibited terms associated with the first language based on the guard list;
    providing the first textual content as an input to the first machine learning model responsive to the first textual content not including the one or more prohibited terms;
    responsive to determining that the first textual content includes the one or more prohibited terms, not making a content recommendation and ending operation of the pipeline,
    responsive to the first textual content not including the one or more prohibited terms, analyzing the first textual content with the first machine learning model to obtain a first content recommendation, the first machine learning model being trained to receive a textual input and to output a recommendation for non-textual content based on the textual input;
    obtaining a first content recommendation policy associated with the first language that identifies non-textual content associated with the first language that may not be provided as a content recommendation;
    determining whether the first content recommendation is not prohibited by the first content recommendation policy by analyzing the first content recommendation using one or more second machine learning models configured to determine whether the first content recommendation is prohibited by the first content recommendation policy, including determining whether a prediction certainty value associated with the first content recommendation satisfies a threshold associated with the first language; and
    performing one of:
        responsive to determining that the first content recommendation is prohibited by the first content recommendation policy, not providing the first content recommendation to the first client device and ending the operation; and
        responsive to determining that the first content recommendation is not prohibited by the first content recommendation policy, providing the first content recommendation to the first client device.

8. The method of claim 7, wherein the guard list of prohibited terms further comprise a set of high severity terms and a set of low severity terms associated with the first language.

9. The method of claim 8, further comprising:
    determining that the textual content includes at least one high severity term of the set of high severity terms; and
    providing no content recommendation to the first client device instead of the first content recommendation responsive to the first textual content including the at least one high severity term.

10. The method of claim 8, further comprising:
    determining that the textual content includes no high severity term and a respective low severity term of the set of low severity terms;
    determining, based on a geographical area associated with the first client device, that the respective low severity term is prohibited in the geographical area; and
    providing no content recommendation to the first client device instead of the first content recommendation responsive to the respective low severity term being prohibited in the geographical area.

11. The method of claim 7, wherein determining that the first content recommendation is not prohibited by the first content recommendation policy further comprises:
    determining a category of recommendation associated with the first content recommendation; and
    determining, based on a geographical area associated with the first client device, that the category of recommendation is not prohibited for the geographical area.

12. The method of claim 7, further comprising:
    obtaining a list of prohibited content items associated with the first language and respective geographical areas in which the prohibited content items are indicated to be offensive; and determining, based on a geographical area associated with the first client device and based on the list of prohibited content items, that the first content recommendation is not prohibited for the geographical area associated with the first client device.

13. A machine-readable medium on which are stored instructions that, when executed, cause a processor of a programmable device to provide a multilingual content recommendation pipeline that determines whether or not to make content recommendations for received textual content by performing operations of:
   obtaining first textual content in a first language from a first client device;
   determining whether the first language is supported by a first machine learning model and performing one of:
   not making a content recommendation and ending operation of the pipeline, if the first language is determined not to be supported;
   responsive to determining that the first language is supported, obtaining a guard list of prohibited terms associated with the first language responsive to determining that the first language is supported;
   determining whether the first textual content does not include one or more prohibited terms associated with the first language based on the guard list;
   providing the first textual content as an input to the first machine learning model responsive to the first textual content not including the one or more prohibited terms;
   responsive to determining that the first textual content includes the one or more prohibited terms, not making a content recommendation and ending operation of the pipeline, responsive to the first textual content not including the one or more prohibited terms, analyzing the first textual content with the first machine learning model to obtain a first content recommendation, the first machine learning model being trained to receive a textual input and to output a recommendation for non-textual content based on the textual input;
   obtaining a first content recommendation policy associated with the first language that identifies non-textual content associated with the first language that may not be provided as a content recommendation;
   determining whether the first content recommendation is not prohibited by the first content recommendation policy by analyzing the first content recommendation using one or more second machine learning models configured to determine whether the first content recommendation is prohibited by the first content recommendation policy, including determining whether a prediction certainty value associated with the first content recommendation satisfies a threshold associated with the first language; and
   performing one of:
      responsive to determining that the first content recommendation is prohibited by the first content recommendation policy, not providing the first content recommendation to the first client device and ending the operation; and
      responsive to determining that the first content recommendation is not prohibited by the first content recommendation policy, providing the first content recommendation to the first client device.

14. The machine-readable medium of claim 13, wherein the guard list of prohibited terms further comprise a set of high severity terms and a set of low severity terms associated with the first language.

15. The machine-readable medium of claim 14, wherein the machine-readable medium includes instructions configured to cause the processor to perform operations of:
   determining that the textual content includes at least one high severity term of the set of high severity terms; and
   providing no content recommendation to the first client device instead of the first content recommendation responsive to the first textual content including the at least one high severity term.

16. The machine-readable medium of claim 14, wherein the machine-readable medium includes instructions configured to cause the processor to perform operations of:
   determining that the textual content includes no high severity term and a respective low severity term of the set of low severity terms;
   determining, based on a geographical area associated with the first client device, that the respective low severity term is prohibited in the geographical area; and
   providing no content recommendation to the first client device instead of the first content recommendation responsive to the respective low severity term being prohibited in the geographical area.

17. The machine-readable medium of claim 13, wherein to determine that the first content recommendation is not prohibited by the first content recommendation policy, the machine-readable medium includes instructions configured to cause the processor to perform operations of:
   determining a category of recommendation associated with the first content recommendation; and
   determining, based on a geographical area associated with the first client device, that the category of recommendation is not prohibited for the geographical area.

* * * * *